United States Patent [19]

Stork

[11] Patent Number: 5,473,912
[45] Date of Patent: Dec. 12, 1995

[54] VEHICLE WITH AN ABSORPTION REFRIGERATOR

[75] Inventor: Sven Stork, Oberbueren, Switzerland

[73] Assignee: Electrolux S.A.R.L., Luxemburg, Sweden

[21] Appl. No.: 258,700

[22] Filed: Jun. 13, 1994

[30] Foreign Application Priority Data

Aug. 4, 1993 [SE] Sweden .................................. 9302559
Oct. 12, 1993 [SE] Sweden .................................. 9303334

[51] Int. Cl.[6] .............................. F25B 15/00; B60H 1/32
[52] U.S. Cl. ............................................... 62/485; 62/239
[58] Field of Search ............................... 62/476, 485, 239

[56] References Cited

U.S. PATENT DOCUMENTS

| | | | |
|---|---|---|---|
| 1,736,871 | 11/1929 | Backstrom | 62/485 |
| 2,118,739 | 5/1938 | Schulman | 62/239 |
| 2,134,188 | 10/1938 | Haywood | 62/485 |
| 2,592,712 | 4/1952 | Knoy | 62/239 |
| 2,895,310 | 7/1959 | Benisch | 62/239 |
| 4,924,676 | 5/1990 | Maier-Laxhuber et al. | 62/59 |
| 5,211,027 | 5/1993 | Lofting et al. | 62/244 |
| 5,231,849 | 8/1993 | Rosenblatt | 62/238.3 |
| 5,355,693 | 10/1994 | McConnell et al. | 62/244 |

*Primary Examiner*—Henry A. Bennett
*Assistant Examiner*—William C. Doerrler
*Attorney, Agent, or Firm*—Pearne, Gordon, McCoy & Granger

[57] ABSTRACT

A vehicle (10) with an absorption refrigerator (12). A condenser (16) and absorber (18) of the refrigerator are cooled by a liquid. The liquid which is circulated by a pump (26) through a radiator (24) which is cooled by ambient air from the shadow beneath the vehicle.

2 Claims, 1 Drawing Sheet

VEHICLE WITH AN ABSORPTION REFRIGERATOR

BACKGROUND OF THE INVENTION

The invention refers to a vehicle with a refrigerator cabinet refrigerated by an absorption refrigerating apparatus arranged on the cabinet, which apparatus shows a condenser and an absorber.

In vehicles such as motor homes and caravans which are provided with refrigerator cabinets operated by an absorption refrigerating apparatus arranged on the cabinet, the heat rejecting parts of the apparatus such as condenser and absorber are usually cooled by air, which is circulated to the parts through openings in the outer wall of the vehicle. The refrigerator is as a rule located close to the outer wall in order that the cooling of the parts shall not become unnecessarily complicated. An example of such a refrigerator is shown in U.S. Pat. No. 3,771,320.

The object of the invention is to improve the known vehicle such that one gets a greater freedom of choice to place the refrigerator therein without the cooling of the absorption refrigerating apparatus being impaired.

SUMMARY OF THE INVENTION

This object is obtained with the vehicle according to the invention wherein a condenser is cooled by a liquid circulating through a radiator, which radiator is cooled by ambient air from beneath the vehicle, and wherein a pump is arranged to circulate the liquid through the radiator.

The cooling air will thereby come from the shadow under the vehicle and will therefore not be heated by the sun when the vehicle stands still but will keep a temperature which under normal circumstances is sufficient for cooling the refrigerating apparatus.

It shall be mentioned that a refrigerator with an absorption refrigerating apparatus, the condenser and absorber of which being cooled by water, is known per se through U.S. Pat. No. 1,609,334. Nothing is, however, mentioned in the patent that the refrigerator would have a connection with a vehicle in the way the present invention aims at.

It shall also be mentioned that through FIG. 1 of U.S. Pat. No. 1,736,871 a refrigerator car is known, the refrigerated space of which being cooled by an absorption refrigerating apparatus located in the space. The condenser of the apparatus is located outside the vehicle and is cooled by ambient air. The absorber of the apparatus does not allow itself to be as easily placed outside the the refrigerated space, but is cooled by self circulating water, which in its turn is cooled by a radiator located outside the vehicle. Here it is not, however, question about a refrigerated cabinet, where it would be too impractical to extend its condenser such that it protrudes outside the vehicle.

BRIEF DESCRIPTION OF THE DRAWINGS

An embodiment of a vehicle according to the invention is described below in connection with the enclosed drawings, where.

DETAILED DESCRIPTION OF THE PREFERRED EMBODIMENTS

Figure 1:
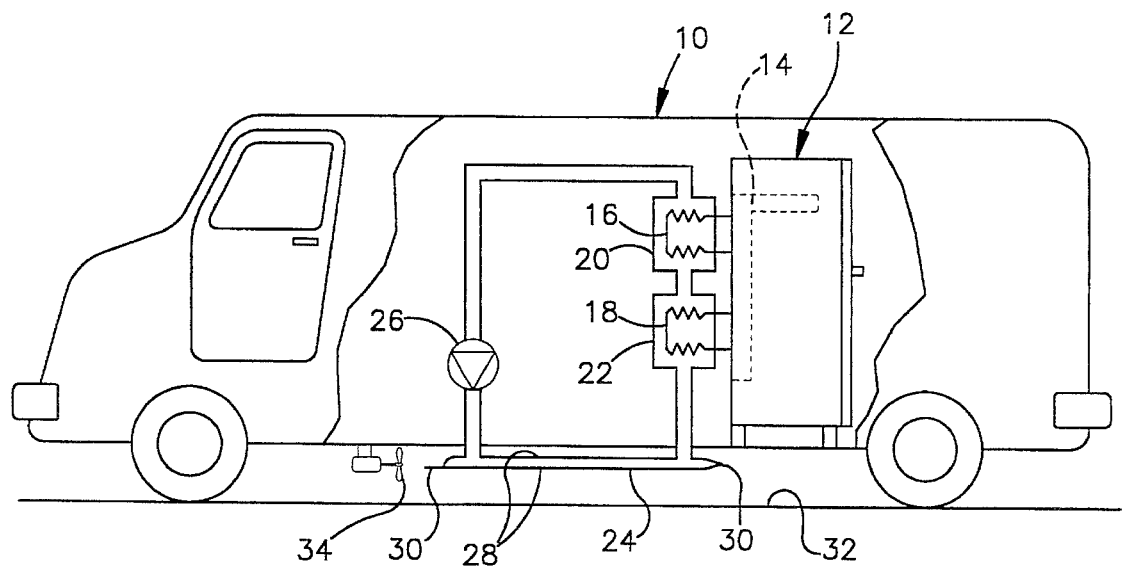
FIG. 1 shows a motor home with a radiator for an absorption refrigerator, which radiator is located under the motor home and, FIG. 2 shows another embodiment of the radiator.

With reference to FIG. 1 numeral 10 designates a motor home, which is provided with a refrigerator cabinet 12 operated by an absorption refrigerating apparatus 14, where the condenser 16 and absorber 18, which are heat rejecting parts of the apparatus, are enclosed in different containers 20 and 22, respectively, through which a liquid, e.g. water, is circulated and cools the condenser 16 and absorber 18. The liquid is in its turn cooled by an air-cooled radiator 24, to which the liquid is circulated by an electrically operated pump 26.

The radiator 24, which is located beneath the vehicle consists of two flat, rectangular plates 28, between which the liquid passes. The plates 28 are welded together at their edges 30 and are arranged substantially parallel with the ground 32 under the vehicle. During travel with the vehicle the radiator 24 is cooled by the wind. The radiator 24 has been made so large, that it normally brings about a sufficient cooling of the liquid also when the vehicle stands still. A fan 34 with an electric driving motor can be arranged to be activated when the vehicle stands still at extreme heat for blowing ambient air on the radiator 24 and thereby cool it.

Figure 2:
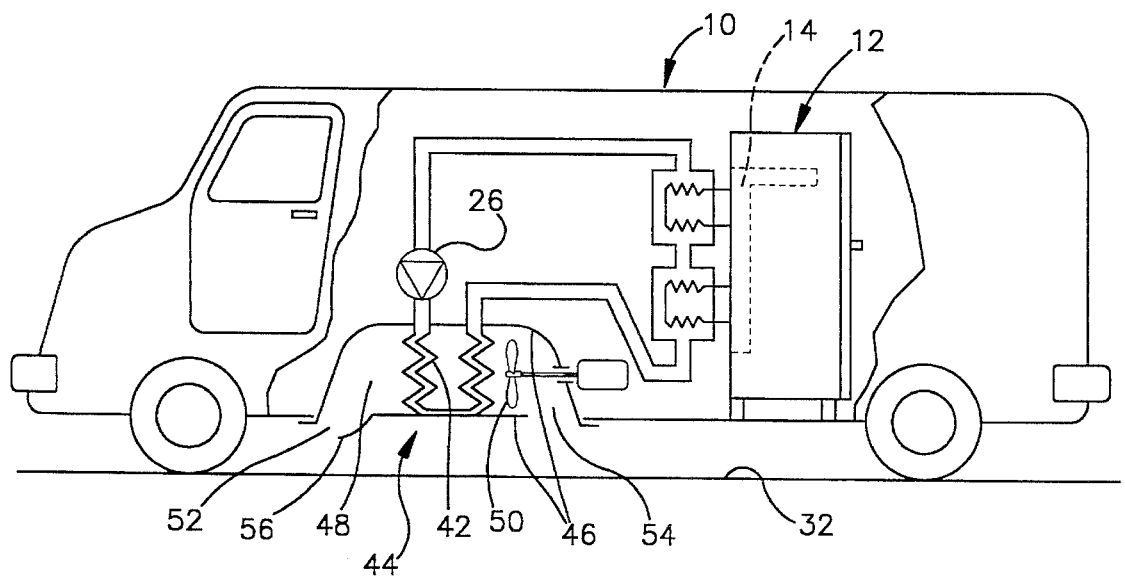

At the embodiment according to FIG. 2 the radiator 42 is part of a mounting unit 44 protruding a bit into the motor home through an opening in its floor, which unit 44 also comprises walls 46 enclosing a duct 48 around the radiator, a fan 50 with an electric driving motor for blowing ambient air through the radiator when necessary, an air inlet 52 to the duct 48 and an air outlet 54 from the duct 48. The pump 26 can also be a part of the unit 44. A shield 56 is arranged at the air inlet 52 to guide wind into the duct 48.

I claim:

1. A vehicle for travelling over ground (32), the vehicle comprising a refrigerator cabinet (12) and an absorption refrigerating apparatus (14) for refrigerating the cabinet, the absorption refrigerating apparatus being arranged on the cabinet and having a condenser (16), an absorber (18), a radiator (24) located beneath the vehicle and cooled by ambient air, and a pump for circulatinq a liquid through the radiator, wherein the condenser and absorber are cooled by the liquid circulating through the radiator, said radiator consisting of two substantially flat plates (28) between which the liquid passes, said plates being substantially parallel to the ground (32) under the vehicle and said radiator being sized to bring about sufficient cooling of the liquid when the vehicle is stationary.

2. Vehicle according to claim 1 further comprising a fan (34) for cooling the radiator (24) by blowing ambient air on the radiator.

* * * * *